United States Patent [19]

Krappweis, Sr.

[11] Patent Number: 5,404,538
[45] Date of Patent: Apr. 4, 1995

[54] METHOD AND APPARATUS FOR MULTILEVEL BUS ARBITRATION

[75] Inventor: Thomas G. Krappweis, Sr., Herndon, Va.

[73] Assignee: International Business Machines Corporation, Armonk, N.Y.

[21] Appl. No.: 967,882

[22] Filed: Oct. 28, 1992

[51] Int. Cl.$^6$ .............................................. G06F 13/14
[52] U.S. Cl. .................... 395/725; 364/242.8; 364/242.9; 364/242.92; 364/247; 364/DIG. 1
[58] Field of Search ................................ 395/725, 275

[56] References Cited

U.S. PATENT DOCUMENTS

| | | | |
|---|---|---|---|
| 4,628,447 | 12/1986 | Cartret et al. | 395/725 |
| 4,788,639 | 11/1988 | Tamoru | 395/725 |
| 4,991,085 | 2/1991 | Pleva et al. | 395/275 |

OTHER PUBLICATIONS

Micro Channel Procedures, Micro Channel Architecture, Nov. 1989, pp.1-21 to 1-29.

*Primary Examiner*—Eric Coleman
*Attorney, Agent, or Firm*—Mark A. Wurm; Joseph C. Redmond

[57] ABSTRACT

A programmable hardware adapter for switching between two or more levels of arbitration priority for devices connected to a communications bus without host processor intervention. The adapter is programmed with an external arbitration value at initial program load. A control bit selects whether the arbitration level within the adapter is used for arbitration or if the device's internal arbitration level is used. When the external arbitration level is used to vie for the bus, the adapter's state machine sends a signal to the device to tell it it won or lost, depending on the outcome of the arbitration.

10 Claims, 3 Drawing Sheets

EXAMPLE 1:
CONDITIONS: ① ARBITRATING WITH INTERNAL ARBITRATION LEVEL.
② ONE OTHER DEVICE CONTENDING ON MICROCHANNEL WITH LOWER PRIORITY THAN INTERNAL ARBITRATION LEVEL.

EXAMPLE 2: ① ARBITRATING WITH EXTERNAL ARBITRATION LEVEL
② ONE OTHER DEVICE CONTENDING ON MICROCHANNEL WITH LOWER PRIORITY THAN EXTERNAL ARBITRATION LEVEL.

EXAMPLE 3: ① ARBITRATING WITH EXTERNAL ARBITRATION LEVEL
② ONE OTHER DEVICE CONTENDING ON MICROCHANNEL WITH HIGHER PRIORITY THAN EXTERNAL ARBITRATION LEVEL.

| EXAMPLE | CONDITIONS/RESULTS | INTERNAL MIC ARBITRATION LEVEL | EXTERNAL MIC ARBITRATION LEVEL | OTHER USER PRIORITY | ARBITRATION VALUE SENT BACK TO MIC AT END OF ARBITRATION CYCLE |
|---|---|---|---|---|---|
| 1 | MSB ↔ LSB | 0<br>0<br>1<br>1 | N/A<br>N/A<br>N/A<br>N/A | 0<br>1<br>1<br>0 | 0<br>0<br>1<br>1 |
| 2 | MSB ↔ LSB | N/A<br>N/A<br>N/A<br>N/A | 0<br>0<br>0<br>1 | 0<br>1<br>1<br>0 | 1 FORCES<br>1 MIC TO<br>1 WIN<br>1 |
| 3 | MSB ↔ LSB | N/A<br>N/A<br>N/A<br>N/A | 1<br>1<br>0<br>0 | 0<br>1<br>1<br>0 | 0 FORCES<br>0 MIC TO<br>0 LOSE<br>0 |

FIG. 3

METHOD AND APPARATUS FOR MULTILEVEL BUS ARBITRATION

BACKGROUND OF THE INVENTION

1. Technical Field

The invention disclosed broadly relates to arbitration on a communications bus and more particularly relates to a method and apparatus for performing multilevel bus arbitration.

2. Background Art

Computers are often connected Via a network to form a local area network (LAN) or a wide area network (WAN). Using this network, computers and peripheral devices are able to communicate with each other. Only one device can be given access to the network at any given time. The Micro Channel (TM IBM Corporation) architecture or MCA is an IBM proprietary backplane communications protocol used in the PS/2 and RS6000 family of computers to allow I/O adapters to communicate with a host processor or other I/O adapters. The arbitration mechanism used in the Micro Channel architecture allows up to 16 adapters to compete for the bus at any given time.

Several Micro Channel interface chips have been developed within IBM and by others to allow communication on the Micro Channel architecture bus. The control chips provide the necessary control and interface logic to allow an I/O adapter to participate in MCA data transactions.

As part of the MCA protocol, an I/O adapter must arbitrate for the Micro Channel bus. The arbitration mechanism implemented in the Micro Channel architecture assigns only a single arbitration value to an adapter at any given time which it uses to compete for the bus. If an adapter wishes to have its arbitration level changed, to either increase or decrease its arbitration priority, the adapter must interrupt the host processor to request the change upon which the host processor reassigns the arbitration level to the adapter. For adapters which execute both high and low priority applications, a significant performance penalty is encountered by not being able to select between multiple arbitration levels when arbitrating for the Micro Channel bus.

Even though there are numerous MCA interface chips which have been developed, both within and outside of the IBM Corporation, to support the Micro Channel protocol, none of them allows selection between arbitration levels when competing for a communications bus.

OBJECTS OF THE INVENTION

It is therefore an object of the invention to provide two or more levels of arbitration priority for the Micro Channel architecture.

It is a further object of the invention to provide switching between two or more levels of priority without any time delay for changing arbitration levels.

It is still a further object of the invention to provide a plurality of arbitration levels without any intervention of a host computer.

SUMMARY OF THE INVENTION

The present invention is a programmable hardware adapter card which allows the switching between priority levels for a device connected to the Micro Channel architecture without any host intervention. One arbitration level which is referred to as the internal arbitration level is stored within a Micro Channel interface chip (MIC). This is the normal arbitration level which the MIC uses to arbitrate for the bus and is loaded into the MIC during a setup cycle which assigns arbitration at initial program load. The other arbitration level is downloaded to the adapter and is stored within the adapter at a register external to the MIC chip. This arbitration level is referred to as the external arbitration level. A control bit is used to select between the two arbitration levels.

When the internal mode is selected during an arbitration cycle, the internal arbitration level is passed through a 2-to-1 multiplexer and out onto the Micro Channel's arbitration bus. The Micro Channel's arbitration signals are then passed back to the MIC chip where an internal state machine executes the MCA arbitration algorithm. In this mode, the external arbitration logic is transparent to the MIC.

During an arbitration cycle when the external mode is selected, the external arbitration level is passed through the other side of the 2-to-1 multiplexer and out onto the Micro Channel's arbitration bus. Unlike the internal mode, the Micro Channel's arbitration signals are passed back to an external state machine which executes the MCA arbitration algorithm rather than being passed back to the MIC.

Since the MIC is unaware of the external arbitration logic, it must be tricked into believing it has won or lost it arbitration bid, depending upon the outcome of the external state machine arbitration results. If the external state machine determines that it won the arbitration, all logic ones are passed back to the MIC, thus tricking the MIC into thinking it has won the bus with its own internal arbitration level, even though the external arbitration value was used. When the external state machine loses, all logic zeros are passed back to the MIC, thus tricking it into thinking it has lost the arbitration.

This technique can be expanded to include any number of external arbitration levels by increasing the number of multiplexers. It may also be used for applications other than Micro Channel arbitration which use a similar arbitration scheme to vie for a communications bus.

BRIEF DESCRIPTION OF THE DRAWINGS

These and other objects, features and advantages of the invention will be more fully appreciated with reference to the accompanying figures.

FIG. 3 is a table illustrating three different cases of arbitration using the present invention.

DISCUSSION OF THE PREFERRED EMBODIMENT

Figure 1:
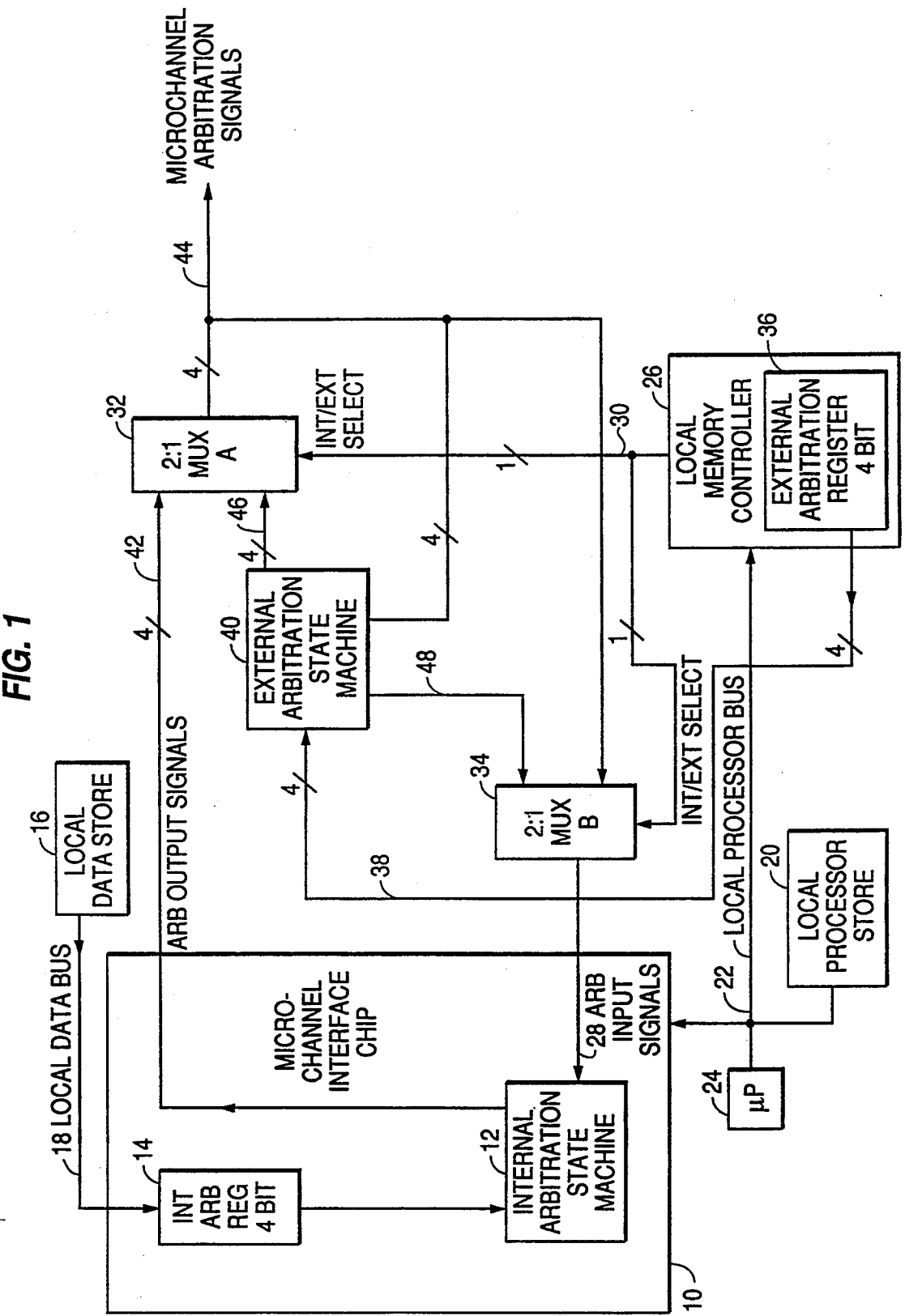
FIG. 1 is a block diagram of an implementation of the multilevel arbitration protocol of the present invention.

An adapter for carrying out the multilevel arbitration scheme of the present invention is shown in FIG. 1. A Micro Channel interface chip 10 contains a state machine 12 and internal arbitration levels 14. The Micro Channel interface chip 10 communicates with a local data storage device 16 via local data bus 18 and likewise communicates with a local processor storage device 20 via local processor bus 22. The host microprocessor 24 controls the operation of the system and communications with a local memory controller 26 via signal lines 22. A write operation is performed over signal lines 22 to set a one-bit register to flag whether internal or external arbitration values are selected. The status of this one-bit signal is sent out on line 30 and controls two 2-to-1 multiplexers 32 and 34. A write operation is also performed over signal lines 22 to set the external arbitration level values in register 36. The external arbitration level is provided as an input to an external state machine via signal lines 38.

An external arbitration state machine 40 is used to vie for the bus when the external arbitration level is selected. State machine 40 is very similar to the state machine contained within the MIC 12 with the added capability of sending a four-bit signal consisting of all zeros or all ones to trick the MIC interface chip into thinking it has won or lost the arbitration vie.

Detailed workings of the Micro Channel interface chip and related MCA protocols can be found in patent application Ser. No. 07/755,477 entitled "Micro Channel Interface Controller" filed Sep. 5, 1991, now abandoned for FWC, which is commonly assigned to the present assignee, the teachings of which are hereby incorporated by reference.

In operation, if the internal arbitration value is selected, the Micro Channel arbitration signals are input to the state machine 12 contained within the Micro Channel interface chip 10, which uses its stored internal arbitration levels from register 14. The state machine sends out its arbitration values onto line 42, through 2-to-1 multiplexer 32 to the MCA bus 44. The resulting line signal of line 44 is input back through MUX 34 to state machine 12 on line 28.

If the external arbitration has been selected, arbitration state machine 40 send its arbitration value from register 36 on line 46 to MUX 32. From there the arbitration value is place on the MCA bus 44. State machine 40 receives the value from the Micro Channel arbitration bus 44 directly and compares it with its external arbitration value as set in register 36 to determine if it is the winner. Meanwhile, the results of the arbitration state machine are sent through bus 48 to the 2-to-1 multiplexer 34 to trick the Micro Channel interface chip 10 into thinking that it has either won or lost arbitration, depending upon the results from the arbitration state machine 40.

Figure 2:
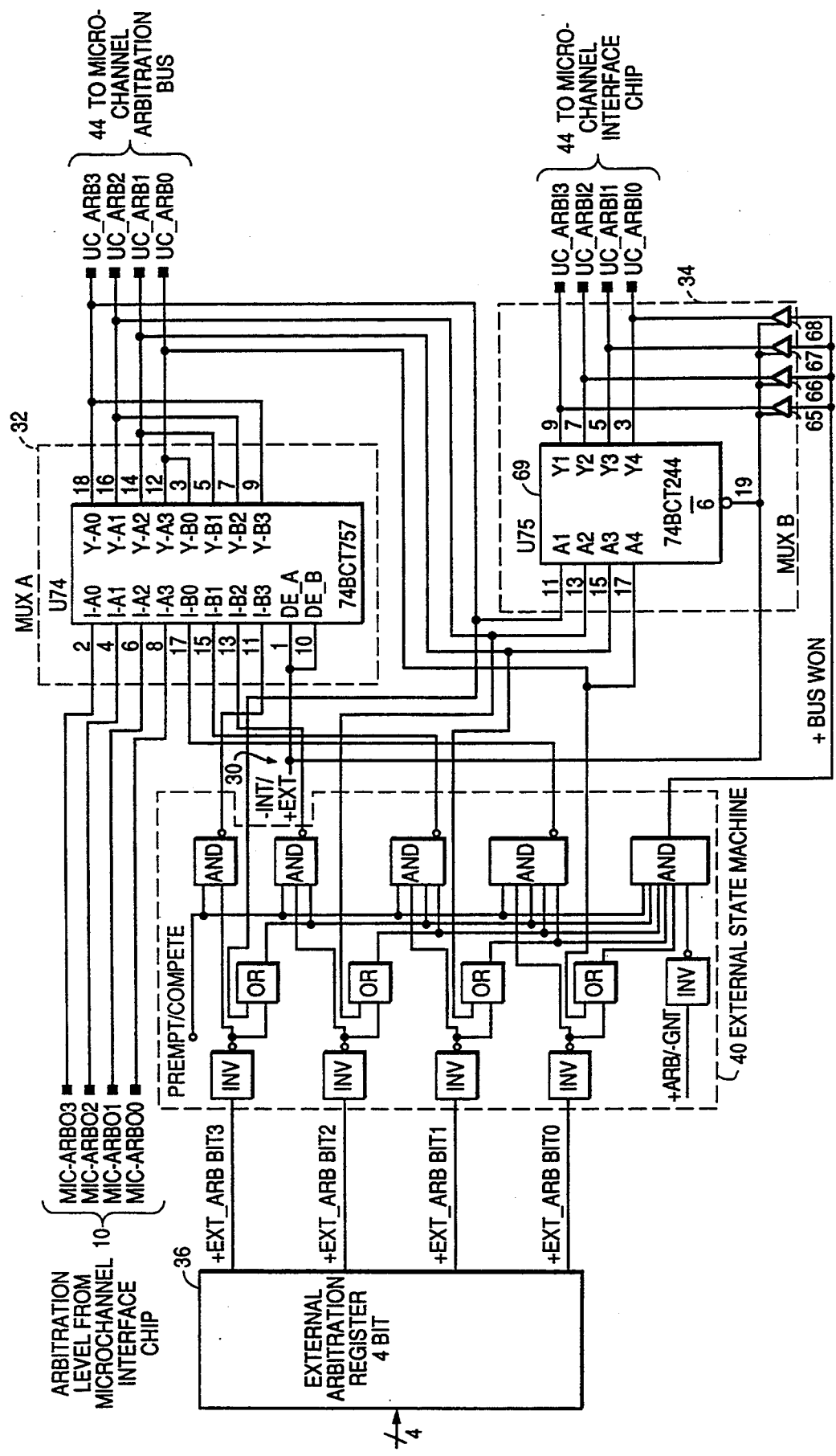
FIG. 2 is a circuit schematic of the multilevel arbitration scheme, according to the present invention.

A more detailed showing of the actual workings of the multilevel arbitration adapter is shown in FIG. 2. In FIG. 2, the arbitration priority level is received by a 2-to-1 multiplexer 32 from the MIC 10 or state machine 40, depending upon the internal or external value being selected by signal 30. The results of the signals on the MCA arbitration bus 44 are fed back to the MIC 10 or external state machine 40.

The state machine consists of inverters and OR gates, which are AND'ed together to form a combinatorial logic arbitration scheme that is employed in the Micro Channel architecture. Register 62 which is the same as register 36, has its four input bits used as arbitration value of the external state machine. In the 2-to-1 multiplexer 34, tri-state drivers 65-68 are used in conjunction with integrated circuit 69 to form a 2-to-1 multiplexer.

The operation of the multilevel arbitration adapter of FIGS. 1 and 2, employs standard Micro Channel architecture for determining the winner of an arbitration vie. The Micro Channel architecture employs a central arbitrator control point according to Micro Channel Architecture published in November of 1989 which is incorporated herein by reference. A central arbitration control point initiates an arbitration cycle by driving the arbitration line low. The requesting local arbitrators then drive their four-bit arbitration value out onto the arbitration bus. When a local arbiter sees a lower more significant bit on the arbitration bus, it stops driving its less significant bits onto the arbitration bus. A local arbiter driving the lowest arbitration level, that is the highest priority, thereby wins control of the channel during an arbitration vie. All participants requesting use of the channel employ combinatorial logic that allows all competing participants to recognize who the winner is. A competing local arbiter drives its arbitration level out onto the arbitration bus, then compares its arbitration level, on a bit-by-bit basis, with the value appearing on the arbitration bus beginning with the most significant bit. If a competing local arbiter detects a mismatch on one of its bits, it immediately stops driving its less significant arbitration value bits. The local arbiter compares it bit value to the mismatched bit.

If the local arbiter has a higher priority (lower value) it wins over the mismatched bit and continues comparing its next most significant bit. If the local arbiter has a lower priority, (higher value) it stops comparing bits, sending all logical ones to the MCA bus.

An illustration of this arbitration scheme is shown in FIG. 3. In example 1, the conditions are arbitrating with an internal arbitration level and one other device is contending on the Micro Channel with a lower priority then the internal arbitration level. In this case, the internal MIC arbitration level is 0011. The external MIC arbitration level is not applicable. The other user has a priority of level 6 (0110). The arbitration value sent back to the MIC at the end of the arbitration cycle is 3. As the bits are compared on a bit-by-bit level, starting with the most significant bit on the left, no determination can be made using only the first significant bit. On the second significant bit, since there is a difference between the internal MIC arbitration level and the user priority, a dot OR of the two levels produces a zero which goes out as a value on the Micro Channel.

In case 2, the arbitrating level is the external arbitration level and the other device contending for the Micro Channel has a lower priority than the external arbitration level. The internal MIC arbitration level is not applicable and the external MIC level 0001 is compared with the priority of the other contending user 0110. The external MIC level wins the arbitration, an arbitration value of all ones is sent to the MIC 10 to indicate that it has won the arbitration.

In case 3, we are again arbitrating with the external arbitration levels and the other device contending on the Micro Channel is a higher priority than the external arbitration level. Comparing the most significant bits in the combinatorial logic of the state machine 40 produces a win for the other contending device. A four-bit arbitration value of all zeros is sent back to the MIC 10 to indicate that it has lost the arbitration and to relinquish any rights it has to the bus.

The technique and apparatus shown can be expanded to include any number of external arbitration levels by increasing the number of multiplexers. By using 4-to-1 or 8-to-1 multiplexers four or eight levels of arbitration, could be obtained.

Though explained in the context of the Micro Channel architecture, this scheme could be used for any other application which uses the same or similar arbitration scheme.

What is claimed is:

1. A method for switching the priority of a device connected to a communication bus among a plurality of arbitration levels comprising the steps of:

storing a first priority level interrupt for use by an assigned internal arbitration state machine;

storing one or more second priority level interrupts for use by one or more assigned external arbitration state machines;

selecting one of the priority interrupt levels for use by the arbitration state machine assigned to such selected interrupt level;

carrying out a communication vie in the device by the internal or external arbitration state machine and as between the selected priority interrupt level and a priority interrupt level on the communication bus; and sending a signal to the internal arbitration state machine indicating the outcome of the communication bus arbitration vie when the external arbitration machine conducts the communication vie.

2. The process of claim 1 wherein the step of sending a signal to the internal arbitration state machine involves a first signal when the communication vie results in the device winning the vie and a second signal to the internal arbitration state machine when the communication vie results in the device loosing the vie.

3. The process of claim 1 wherein each priority interrupt level is represented by a binary number.

4. The process of claim 3 wherein the priority interrupt level having the lowest binary number wins the communication vie among competing adapters coupled to the communications bus.

5. An adapter for performing multiple level priority arbitration connected to a communications bus comprising:

an internal arbitration state machine including an internal arbitration register containing a priority interrupt level;

an external arbitration state machine including an external arbitration register containing a priority interrupt level;

means for selecting one of the priority interrupt levels for use by the arbitration state machine assigned to such selected interrupt level;

carrying out a communication vie in the adapter by the internal or external arbitration state machine and as between the selected priority interrupt level and a priority interrupt level on the communication bus; and means for indicating to the internal arbitration state machine the outcome of the communications bus arbitration vie when the external arbitration machine conducts the communication vie.

6. The adapter of claim 5 wherein each priority interrupt level is represented by a binary number and the lowest binary number wins the communication vie among competing adapters for the communications bus.

7. The adapter of claim 6 wherein the competing adapters share the same lines of the communications bus in conducting the communication vie.

8. A system for providing multiple level arbitration for a device connected to a communications network comprising:

a host processor for assigning an arbitration value to an internal arbitration register and to one or external arbitration register contained in the device;

means for carrying out a network arbitration priority vie in an internal or external arbitration state machine contained in the device by using the arbitration value in the internal or external arbitration register versus a priority arbitration level on the communications network; and means for indicating to the internal arbitration state machine the outcome of the priority vie when the vie is conducted by the external arbitration state machine.

9. The system of claim 8 wherein the same lines of the network are shared by all devices participating in the network priority vie.

10. The system of claim 9 wherein each arbitration value is represented by a binary number and the lowest binary number wins the communication vie among competing devices coupled to the communications network.

* * * * *